Oct. 21, 1952     H. C. L. MILLER ET AL     2,614,513
METHOD OF AND VORTEX-TYPE FURNACE FOR BURNING WASTE FUEL
Filed March 28, 1950
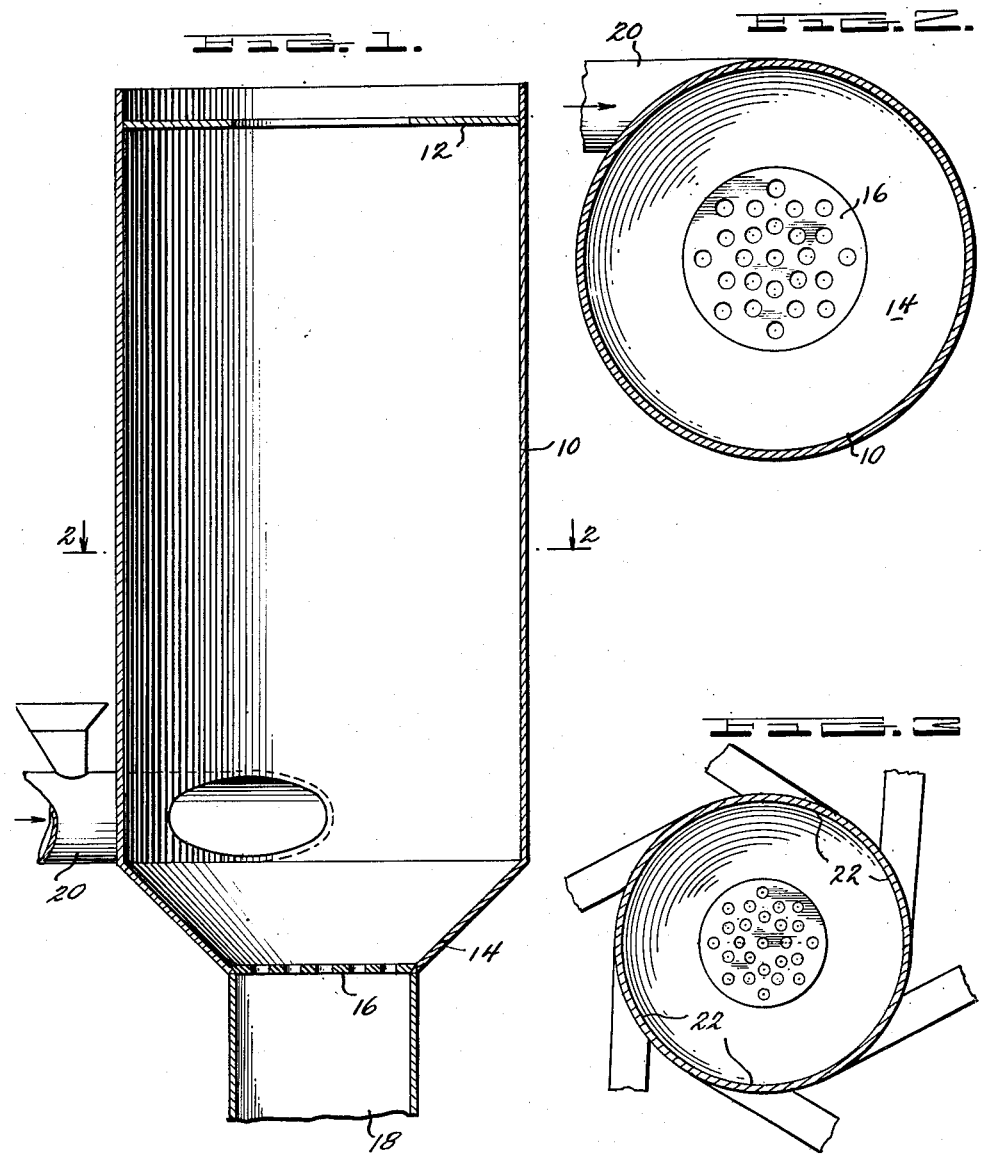
INVENTORS
HENRY C.L. MILLER
HARRY A. RADDIN
BY
ATTORNEY Patented Oct. 21, 1952

2,614,513

UNITED STATES PATENT OFFICE 2,614,513

METHOD OF AND VORTEX-TYPE FURNACE FOR BURNING WASTE FUEL

Henry C. L. Miller and Harry A. Raddin, Richmond, Va., assignors to The Hofft Company, Inc., Indianapolis, Ind., a corporation of Indiana Application March 28, 1950, Serial No. 152,294

3 Claims. (Cl. 110—7)

It is an object of this invention to provide a method and apparatus for burning waste products which are relatively moist and made up of particles of a variety of sizes and weights.

It is a further object of this invention to provide a method and apparatus as aforesaid in which there will be a minimum of carry-over of solid particles in the emerging flue gas.

It is a further object of this invention to provide a method and apparatus which may be used in connection with any form of conventional boiler.

The above and other objects will be made clear from the following detailed description taken in connection with the annexed drawings, in which:

Figure 1 is a vertical section through the improved apparatus;

Figure 2 is a section taken on the line 2—2 of Figure 1; and

Figure 3 is a view similar to Figure 2 showing an alternative construction.

The invention will be described with reference to the burning of bagasse, but it is to be understood that the invention is not limited to that purpose, but may be applied to any waste fuel such as bark, saw-dust, shavings, etc.

In burning a fuel such as bagasse, there is a considerable moisture content in the fuel as supplied to the furnace, and the particle size and shape is by no means uniform. The process of burning such fuel requires that it first be dried, then the volatile components driven off and burned, and finally that the residual combustible solids be burned. There is, in this connection, a very practical problem in that when a draft is sufficient to dry and burn the larger particles at a rapid rate, it is apt to carry over into the boiler and flues a large proportion of the fine particles. This not only is a waste of fuel, but a great source of maintenance expense due to the necessity of cleaning boiler surfaces, furnaces, flues, etc.

The present invention attacks the problem just mentioned by mingling the fuel with air into a fairly high velocity jet and introducing this tangentially and horizontally into a vertical, cylindrical combustion chamber. The point of entry is well below the top of the chamber, which is provided with a foraminous bottom through which about twenty-five percent of the total air is supplied, the remaining air being supplied in the tangential jet. The jet of air and fuel proceeds circumferentially around the chamber, with the jet diverging up and down the chamber wall. The larger, heavier particles drop rather promptly to the foraminous bottom and are subjected to a relatively slow upwardly directed air current. The finer particles either cling to the hot wall of the combustion chamber or are suspended in the generally turbulent air movement. The particles clinging to the wall are dried by the heat of the wall and the passage of air and hot gases over them. These give up their volatile matter, dry out and are carried into the body of the chamber and burned. The essential feature is that the high velocity gases are directed tangentially, and only a low velocity affects the gases moving toward the boiler surfaces and flues. There is, therefore, very little tendency to carry over unburned fines. The fuel bed, comprised of such fuel as sticks to the furnace wall is always thin, and the drying and decomposing action is consequently rapid.

Referring now to Figure 1 there is shown a cylindrical combustion chamber 10 having an annular baffle 12 adjacent its upper end and a conical section 14 at its lower end, the conical section 14 terminating in a foraminous plate 16 which is supplied with air by a duct 18. The orifice through the baffle may be either circular or rectangular as the form of the boiler may require.

Substantially adjacent the rim of the conical section 14 is an inlet 20 directed tangentially of the chamber 10. This is supplied with a high velocity jet of air into which the bagasse, sawdust or other fuel is deposited continuously by any suitable means such, for example, as a screw conveyor. It is preferred that the fuel feeding means deposit the fuel downwardly from above the air jet. The fuel is intimately mixed with and carried by the jet which, as it encounters the wall of the chamber 10, is guided in a circular path and diverges both above and below the center line of the jet. This sets up a vortex action within the chamber 10 with the result that the heaviest particles drop down upon the plate 16 and are agitated by air coming through the duct 18. The finest and lightest particles are suspended and thrown to the outside walls of the chamber 10 and are distributed around the wall of the chamber in the circular, diverging path of the jet.

As the particles are suspended close to the walls of the chamber 10 they are subjected to the continuous effect of the jet and are dried by the continuously evolving combustible gases and finally become light and dry enough to ignite and burn and thus take part in the general combustion occurring within the chamber. The sequence of drying, evolution of volatile matter, and ultimate combustion is extremely rapid and complete due to the high velocity of the jet and consequent intimate mixing of fuel and air particles. Nevertheless, due to the tangential action there is no tendency to carry particles out of the combustion chamber because of the centrifugal effect throwing them to the periphery which effect persists so long as they remain solid. The energy of the high velocity jet is expended in turbulence within the chamber and exerts no carrying effect toward the outlet. A major portion of the total air supplied is concentrated in the jet 20 and the balance is supplied by duct 18 through the foraminous plate 16. This combined with the effect of the baffle 12 minimizes carry-over of solid particles while retaining the benefit of the high velocity feeding jet.

While a single jet will be entirely adequate for most purposes, any number of jets may be employed even to the point of providing, as shown in Figure 3, a series of tangentially arranged jets so numerous as to provide practically complete peripheral coverage. When such jets 22 are arranged as shown in Figure 3 there will be little or no deposition of material directly in the circumferential path of the jets and the deposition of material will occur almost exclusively in the areas of divergence above and below the areas of the jets themselves.

It will be also understood that in order to start the operation of the apparatus it may be heated up with gas, oil or electric means, or in any desired manner.

While certain specific embodiments of this invention have been disclosed herein, the invention is not to be limited to the details disclosed but only as set forth in the subjoined claims.

We claim:

1. A method of burning comprising: forming a relatively high velocity continuous jet of a mixture of combustible particles of light weight, diverse sizing, high moisture content and high volatile content and air; directing said jet into a confined atmosphere maintained above ignition temperature, guiding the jet in a horizontal circular path while causing it to diverge vertically above and below the centerline of the jet, and directing from substantially below the centerline of the jet a current of air of a velocity relatively lower than that of said jet upwardly through substantially the center of the circular path.

2. A method according to claim 1 in which the major portion of total air required for combustion is supplied through said jet and the balance through said current.

3. A furnace for burning substantially solid waste fuels comprising: a cylindrical combustion chamber having a vertical axis, said combustion chamber having an annular plate means at its upper end and defining a constricted flue gas outlet centered on said axis and having its opening of a diameter materially less than that of said chamber, a foraminous plate closing the lower end of said chamber, means to direct a high velocity jet of air and fuel tangentially of said chamber into the lower portion of said chamber, the center line of said jet being at the foraminous plate end of said chamber, and means to supply a minor portion of the air supply to said chamber through said foraminous plate at a velocity relatively lower than that of said jet, the height of said chamber being at least substantially twice its diameter.

HENRY C. L. MILLER.
HARRY A. RADDIN.

REFERENCES CITED

The following references are of record in the file of this patent:

UNITED STATES PATENTS

| Number | Name | Date |
|---|---|---|
| 901,232 | Eldred | Oct. 13, 1908 |
| 1,091,475 | Best | Mar. 31, 1914 |
| 1,444,833 | Haner | Feb. 13, 1923 |
| 1,766,652 | Koch | June 24, 1930 |
| 1,852,968 | Hillhouse | Apr. 5, 1932 |
| 2,088,879 | Stouff | Aug. 3, 1937 |
| 2,242,653 | Maxwell | May 20, 1941 |
| 2,294,242 | Rohrer | Aug. 25, 1942 |
| 2,395,103 | Clausen | Feb. 19, 1946 |
| 2,483,728 | Glaeser | Oct. 4, 1949 |